United States Patent [19]
Kirby et al.

[11] Patent Number: 5,562,455
[45] Date of Patent: Oct. 8, 1996

[54] HAZARDOUS MATERIALS TRAINING CYLINDER

[76] Inventors: James Kirby; Cathy Kirby, both of 49 Gully Dr., both of Scarborough, Ontario, Canada, M1K 4W3

[21] Appl. No.: 523,776

[22] Filed: Sep. 5, 1995

[51] Int. Cl.[6] ....................................... G09B 9/00
[52] U.S. Cl. ............................................... 434/226
[58] Field of Search ................................. 434/226, 219

[56] References Cited

U.S. PATENT DOCUMENTS

| | | | |
|---|---|---|---|
| 4,303,397 | 12/1981 | Swiatosz | 434/226 |
| 4,526,548 | 7/1985 | Livingston | 434/226 |
| 5,052,933 | 10/1991 | Rogers et al. | 434/226 |
| 5,275,571 | 1/1994 | Musto et al. | 434/219 |
| 5,320,536 | 6/1994 | Rogers et al. | 434/226 |
| 5,335,559 | 8/1994 | Rogers et al. | 434/226 |
| 5,345,830 | 9/1994 | Rogers et al. | 434/226 |
| 5,447,437 | 9/1995 | Joynt et al. | 434/226 |

*Primary Examiner*—Paul J. Hirsch

[57] ABSTRACT

A hazardous materials training cylinder comprising: a main housing unit having an essentially hollow interior and a top including a plurality of smoke vent holes and a nozzle, a control panel including plurality of control knobs and an intake panel having a plurality of connection ports being affixed to the main housing unit, a gas hose and valve and a liquid hose and valve being coupled to the gas and liquid ports, a smoke generator device having an output hose coupled to the smoke connection port; gas and liquid distribution tubes being operatively coupled to the control panel, a smoke conduit having an upper end affixed around the smoke vent holes and a lower end coupled to the smoke intake port, a smoke control hose operatively coupling the control panel and smoke conduit, a plurality of gas and liquid supply hoses coupling the connection ports, gas and liquid distribution tubes, and nozzle together.

6 Claims, 4 Drawing Sheets

HAZARDOUS MATERIALS TRAINING CYLINDER

BACKGROUND OF THE INVENTION

1. Field of the Invention

The present invention relates to a hazardous materials training cylinder and more particularly pertains to simulating hazardous material emergencies for training purposes.

2. Description of the Prior Art

The use of fire fighter training devices is known in the prior art. More specifically, fire fighter training devices heretofore devised and utilized for the purpose of utilizing the devices to train fire fighters are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,320,536 to Rogers a fire fighting trainer and apparatus including smoke generating means.

U.S. Pat. No. 4,861,270 to Ernst discloses a fire fighting trainer.

U.S. Pat. No. 5,345,830 to Rogers discloses a fire fighting trainer and apparatus including a temperature sensor.

U.S. Pat. No. 5,335,559 to Rogers discloses a fire fighting trainer apparatus.

Lastly, U.S. Pat. No. 4,526,548 to Livingston discloses a mobile fire fighter training equipment.

In this respect, the hazardous materials training cylinder according to the present invention substantially departs from the conventional concepts and designs of the prior art, and in doing so provides an apparatus primarily developed for the purpose of simulating hazardous material emergencies for training purposes.

Therefore, it can be appreciated that there exists a continuing need for a new and improved hazardous materials training cylinder which can be used for simulating hazardous material emergencies for training purposes. In this regard, the present invention substantially fulfills this need.

SUMMARY OF THE INVENTION

In view of the foregoing disadvantages inherent in the known types of fire fighter training devices now present in the prior art, the present invention provides an improved hazardous materials training cylinder. As such, the general purpose of the present invention, which will be described subsequently in greater detail, is to provide a new and improved hazardous materials training cylinder and method which has all the advantages of the prior art and none of the disadvantages.

To attain this, the present invention essentially comprises a new and improved hazardous materials training cylinder comprising, in combination: a main housing unit formed in a generally cylindrical configuration with a rounded top, a front region, a rear region including a handle, a flat bottom and an essentially hollow interior, the rear region including wheels rotatably mounted adjacent to the bottom, the top including a plurality of smoke vent holes, a nozzle extending upwardly from the approximate centerpoint of the top, the nozzle including a large water aperture, a small air aperture and a control handle to regulate the flow of air and water therethrough, the nozzle including a lower member with air and water apertures, the lower member extending downwardly into the interior of the main housing unit, the front region including two legs affixed to the bottom, a pinhole leak valve extending through the main housing unit beneath the top, the main housing unit further including upper and lower rectangular recesses positioned within the front region; a control panel formed in a generally rectangular configuration and hingedly attached within the upper recess of the front region, the control panel having a plurality of rotatable knobs including a smoke control knob, a supply air knob, a supply water knob, a pinhole air knob and a pinhole water knob, corresponding indicia being located adjacent to each knob; an intake panel formed in a generally rectangular configuration and hingedly attached within the lower recess of the front region, the intake panel having a plurality of connection ports formed in a generally circular configuration including an air connection port, a water connection port and a smoke connection port, an air pressure regulator valve and a water pressure regulator valve being releasable couplable within the air and water connection ports respectively, an air hose and a water hose being coupled to the air and water valves respectively, in an operative orientation the air and water hoses being coupled to an air and water source respectively, a smoke reception tube being located within the interior of the main housing unit and formed in a generally cylindrical configuration with a first open end coupled to the smoke connection port, the smoke reception tube including a free second open end, a smoke generator device including a rotatable control knob, the smoke generator device having a large output hose extending therefrom, the output hose having a free end couplable to the smoke connection port; an air distribution tube and a water distribution tube, each distribution tube containing a plurality of apertures therethrough and being operatively coupled to the air and water control knobs respectively, a three-way connector being coupled to the water distribution tube and a four-way connector being coupled to the air distribution tube, a smoke control valve being operatively coupled to the smoke control knob; a smoke reservoir formed in a generally cylindrical configuration and positioned within the hollow interior of the main housing unit, the reservoir being affixed around the smoke vent holes and lower member of the nozzle, the reservoir having a lower extent including a funnel with a open end, a smoke conduit pipe formed in an elongated cylindrical configuration with a first end coupled to the open end of the funnel and a second end coupled to the smoke reception tube; and air and water supply hoses each having a first end coupled to the respective air and water connection ports and a second end coupled to the respective air and water distribution tubes, a water nozzle hose having a first end coupled to the three-way connector and a second end coupled within the water aperture in the lower member of the nozzle, an air nozzle hose having a first end coupled to the four-way connector and a second end coupled within the air aperture in the lower member of the nozzle, a water pinhole hose having a first end coupled to the three-way connector and a second end coupled to the pinhole leak valve, an air pinhole hose having a first end coupled to the four-way connector and a second end coupled to the pinhole leak valve, a short bypass hose having a first end coupled to the four-way connector and a second end coupled within the smoke control valve, an auxiliary air hose having a first end connected to the smoke control valve and a second end connected to the smoke reception tube.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hazardous materials training cylinder which has all of the advantages of the prior art fire fighter training devices and none of the disadvantages.

It is another object of the present invention to provide a new and improved hazardous materials training cylinder which may be easily and efficiently manufactured and marketed.

It is further object of the present invention to provide a new and improved hazardous materials training cylinder which is of durable and reliable constructions.

An even further object of the present invention is to provide a new and improved hazardous materials training cylinder which is susceptible of a low cost of manufacture with regard to both materials and labor, and which accordingly is then susceptible of low prices of sale to the consuming public, thereby making such hazardous materials training cylinder economically available to the buying public.

Still yet another object of the present invention is to provide a new and improved hazardous materials training cylinder which provides in the apparatuses and methods of the prior art some of the advantages thereof, while simultaneously overcoming some of the disadvantages normally associated therewith.

Still another object of the present invention is to simulating hazardous material emergencies for training.

Lastly, it is an object of the present invention to provide a new and improved hazardous materials training cylinder comprising: a main housing unit having a front region, a rear region, a top and an essentially hollow interior, the top including a plurality of smoke vent holes and a nozzle extending upwardly therefrom, a control panel including plurality of control knobs and an intake panel having a plurality of connection ports, each panel being affixed to the front region, a gas hose and valve and a liquid hose and valve being coupled to the gas and liquid ports respectively, a smoke generator device having a large output hose coupled to the smoke connection port; gas and liquid distribution tubes being operatively coupled to the control panel, a smoke conduit having an upper end affixed around the smoke vent holes within the main housing unit and a lower end coupled to the smoke intake port, a smoke control hose operatively coupling the control panel to the smoke conduit, a plurality of gas and liquid supply hoses coupling the connection ports, gas and liquid distribution tubes, and nozzle together thereby permitting users to simulate hazardous material emergencies by manipulating the knobs of the control panel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
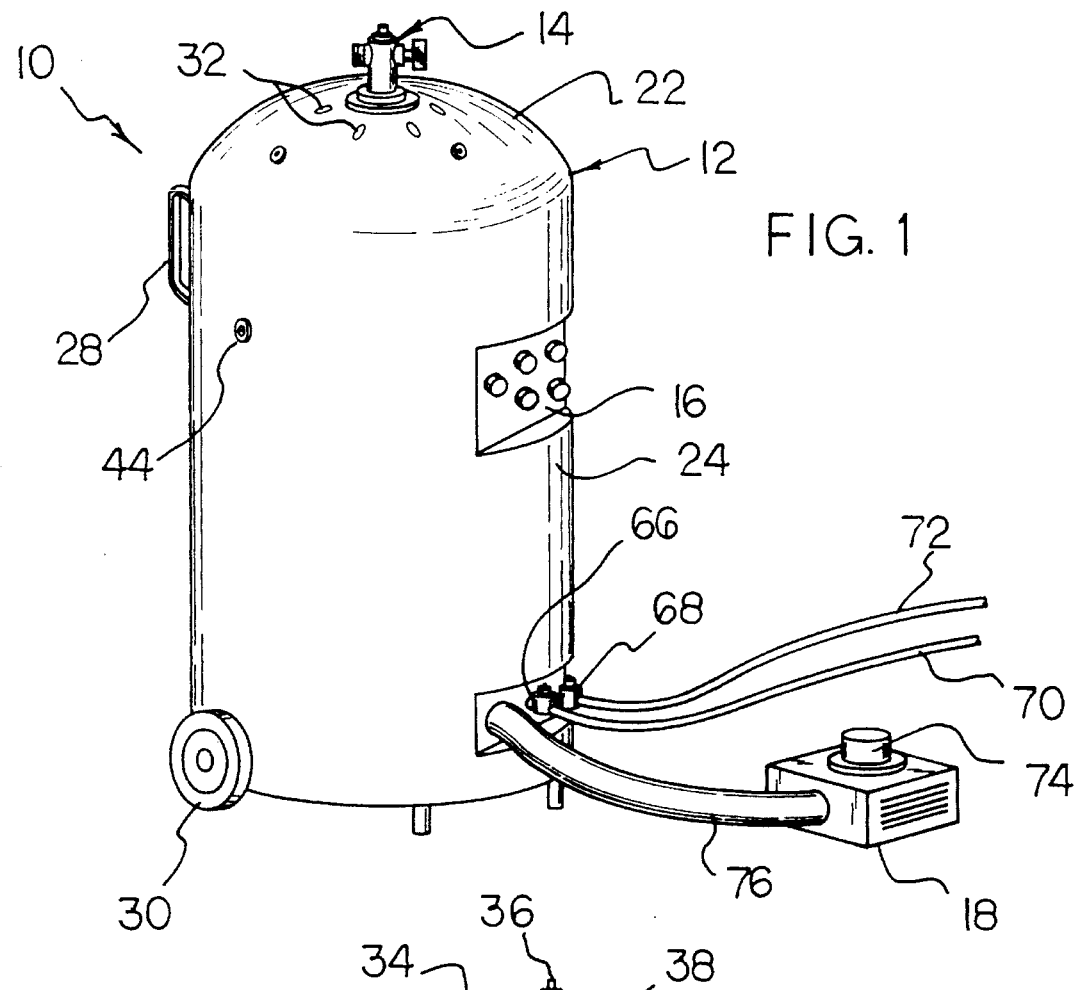
FIG. 1 is a perspective view of the preferred embodiment of the hazardous materials training cylinder constructed in accordance with the principles of the present invention.

With reference now to the drawings, and in particular to FIG. 1 thereof, the preferred embodiment of the new and improved hazardous materials training cylinder embodying the principles and concepts of the present invention and generally designated by the reference numeral 10 will be described.

The present invention, the hazardous materials training cylinder 10 is comprised of a plurality of components. Such components in their broadest context include a main housing unit 12, a nozzle 14, a control panel 16, a smoke generator 18, and an intake panel 20. Such components are individually configured and correlated with respect to each other so as to attain the desired objective.

Figure 2:
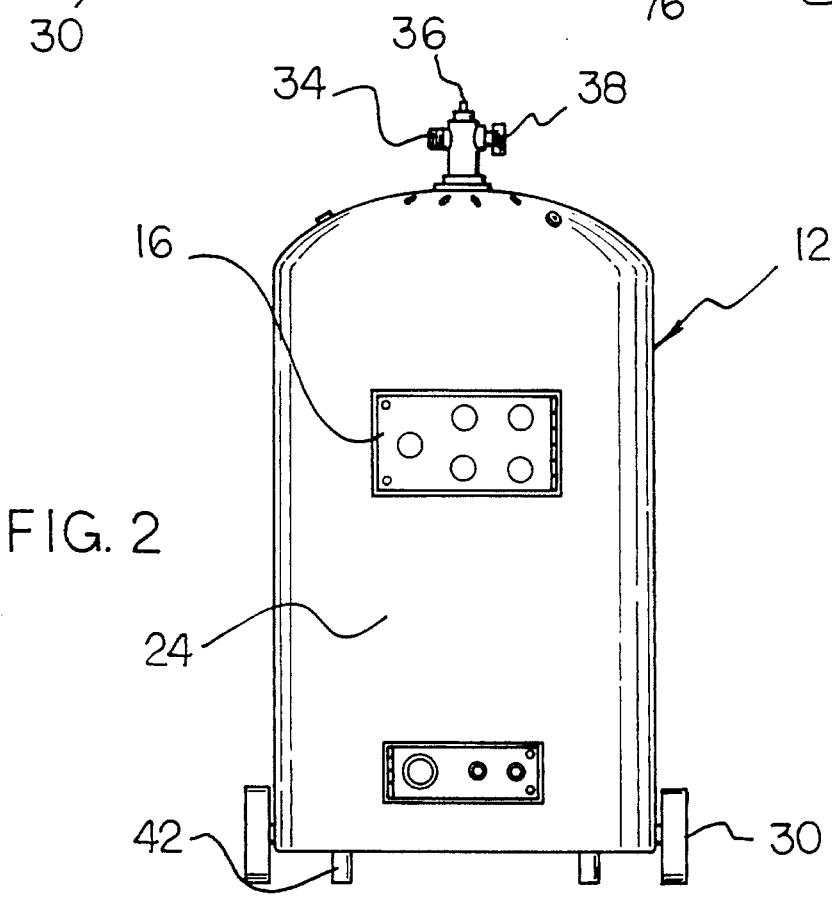
FIG. 2 is a front perspective view of the apparatus shown in FIG. 1.

The main housing unit 12 is formed in a generally cylindrical configuration with a rounded top 22, a front region 24, a rear region, a flat bottom 26 and an essentially hollow interior. The cylindrical shape of the main housing unit emulates a real gas cylinder in which a leak would occur. The main housing unit is fabricated of steel or aluminum in the preferred embodiment. The various internal components of the apparatus are fabricated of copper, brass, and various synthetic materials. The rear region includes a handle 28 which is adjacent to the rounded top. The rear region includes wheels 30 rotatably mounted adjacent to the bottom. The wheels and handle allow a user to easily tilt and transport the apparatus from place to place. Gases and other chemicals utilized to simulate hazardous materials leaks may be introduced directly within the hollow interior of the main housing unit. The sturdy construction of the main housing unit prevents unwanted leakage or collapse. Note FIGS. 1 and 2.

The rounded top has a plurality of smoke vent holes 32 positioned within its center. The center also includes a nozzle 14 that extends upwardly. The nozzle includes a large water aperture 34, a small air aperture 36 and a control handle 38 to regulate the flow of air and water through it. The nozzle allows an operator to release pressurized air, water, or both to simulate a hazardous material leak. Note that in alternative embodiments of the apparatus, gases such as propane, ammonia, or chlorine may be utilized. Also, alternative embodiments of the apparatus utilize a plurality of liquid chemicals in place of water. Note FIGS. 1 and 2.

Figure 5:
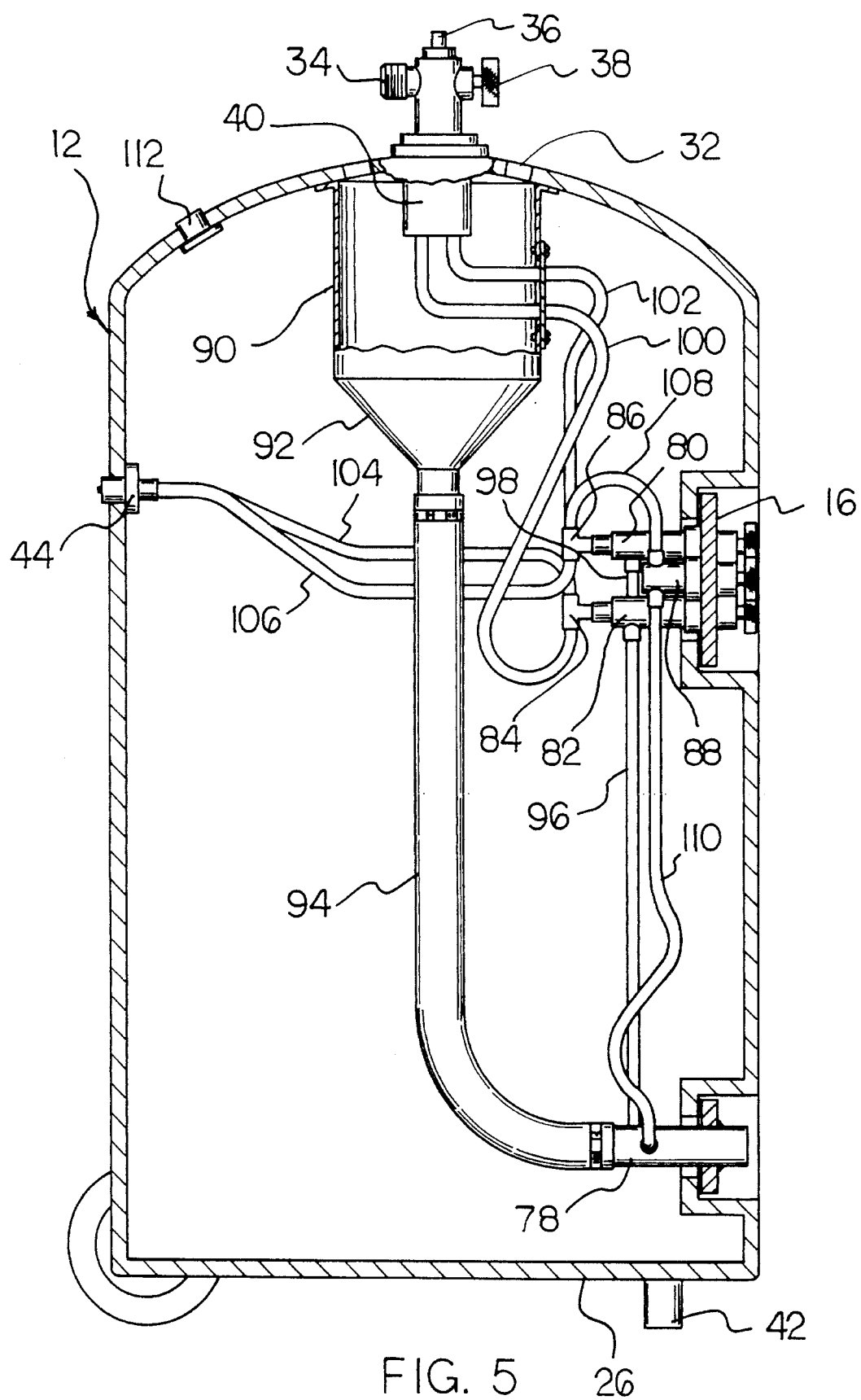
FIG. 5 is a cross sectional view of the main housing unit.

The nozzle includes a lower member 40 which extends downward into the interior of the main housing unit. The lower member has an air aperture and a water aperture. In an operative orientation, air and water are introduced to the nozzle through the apertures. The front region includes two legs 42 affixed to the flat bottom. The legs provide a level surface for the apparatus. The main housing unit also includes a pinhole leak valve 44 positioned beneath the rounded top. The pin hole leak valve enables users to simulate small, high pressure hazardous waste leaks. The main housing unit further includes upper and lower rectangular recesses positioned within the front region. Note FIGS. 1 and 5.

In an alternative embodiment of the apparatus, the periphery of the rounded top section includes a plurality of rupture disks 112. The rupture disks allow a user to simulate a large puncture of a cylinder. Additionally, the rupture disks are utilized as a safety precaution in case excessive pressure builds up in the cylinder during operation. Note FIGS. 1 and 5.

Figure 3:
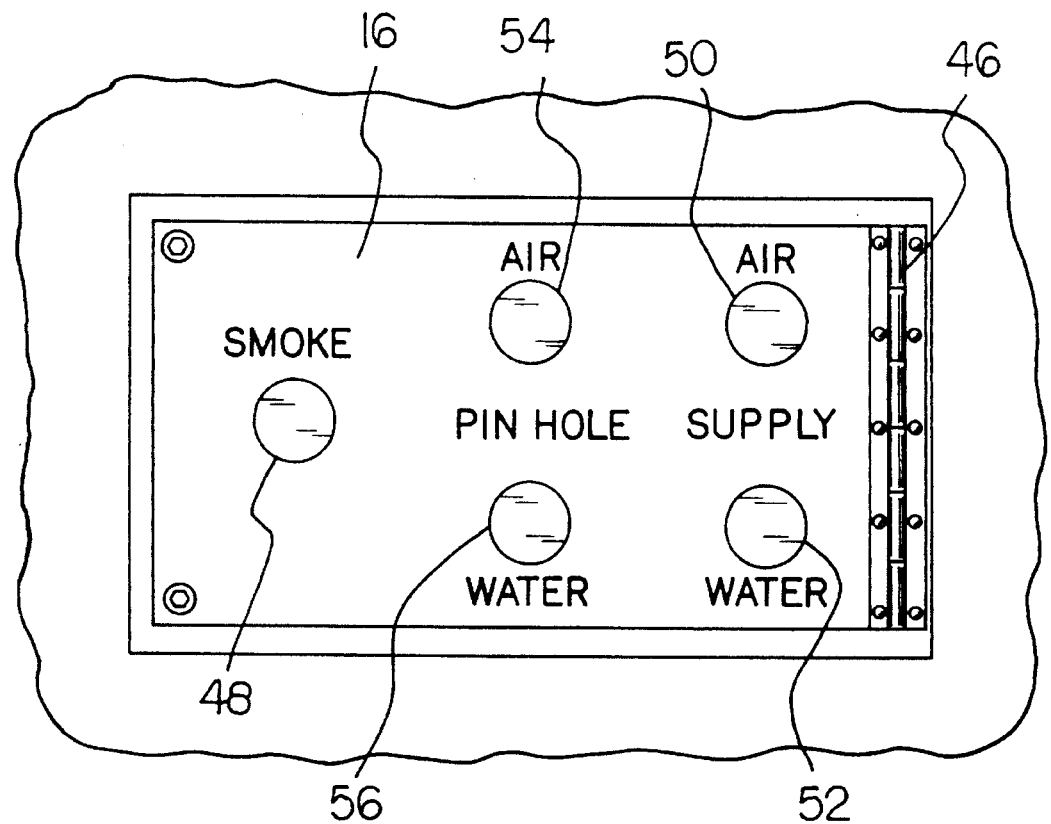
FIG. 3 is an isolated perspective view of the control panel of the apparatus.

A control panel 16 is formed in a generally rectangular configuration and is positioned within the upper recess of the front region. The control panel is attached to the main housing unit by a hinge 46. The control panel includes five rotatable knobs. The hinged configuration of the control panel permits easy access to the components of the control panel when repair is necessary. The control panel includes a smoke control knob 48, a supply air knob 50, a supply water knob 52, a pinhole air knob 54 and a pinhole water knob 56. Corresponding indicia is located adjacent to each knob. In operation, a user simply locates the desired knob and rotates it in a clockwise direction in order to create the desired simulated emergency scenario. Note FIG. 3.

Figure 4:
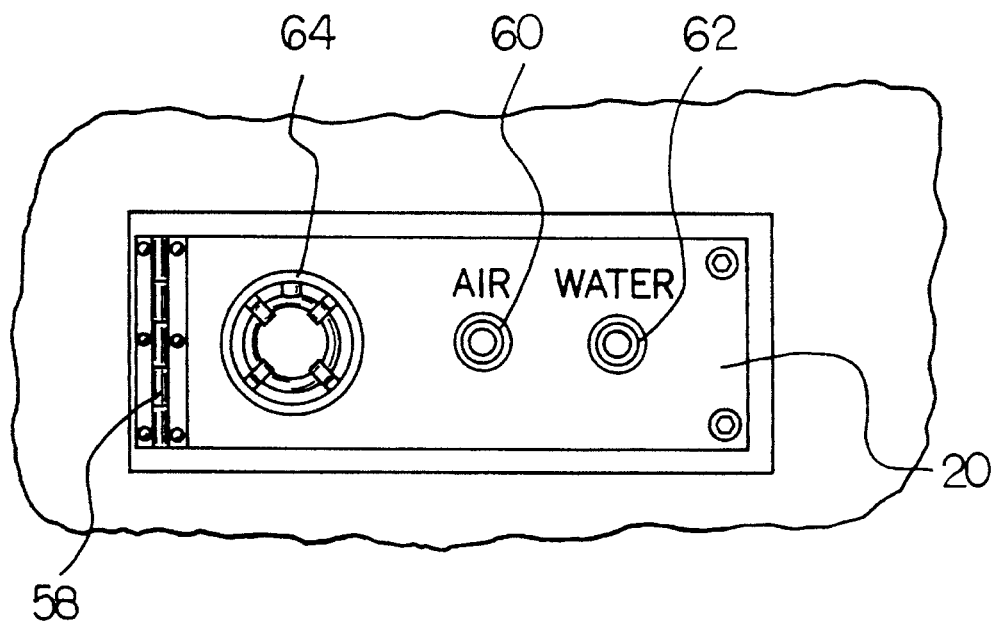
FIG. 4 is an isolated perspective view of the intake panel of the apparatus.

An intake panel 20 is formed in a rectangular configuration and positioned within the lower recess of the front region. The intake panel includes a hinge 58 which attaches the panel to the main housing unit. The intake also includes three connection ports. The ports are formed in a circular configuration and include an air connection port 60, a water connection port 62 and a four inch smoke connection port 64. The ports are configured to permit only one way movement of gas or liquid into the main housing unit. Note FIG. 4.

An air pressure regulator valve 66 and a water pressure regulator valve 68 are releasably couplable to the air and water connection ports. An air hose 70 and a water hose 72 are coupled to the air and water valves, respectively. The air and water hoses are coupled to an air and water source. Note that in alternative embodiments, other gases or liquids may be employed by a user. The valves permit only one-way movement of gas or liquid into the main housing unit, as well as regulating the desired pressure of the stream. Note FIG. 1.

A smoke generator device 18 includes a rotatable control knob 74. The smoke generator device includes means to create smoke, the color and intensity of which may be controlled by the rotatable control knob. The smoke generator device has a large output hose 76 that extends outwardly from it. The output hose has a free end couplable to the smoke connection port. Note FIG. 1.

An approximately four inch smoke reception tube 78 is located in the interior of the main housing unit. This is formed in a cylindrical configuration with a first open end coupled to the smoke connection port. The smoke reception tube includes a free second open end. In an operative orientation, smoke from the smoke generator device is introduced to the main housing unit through the smoke reception tube. Note FIG. 5.

Figure 6:
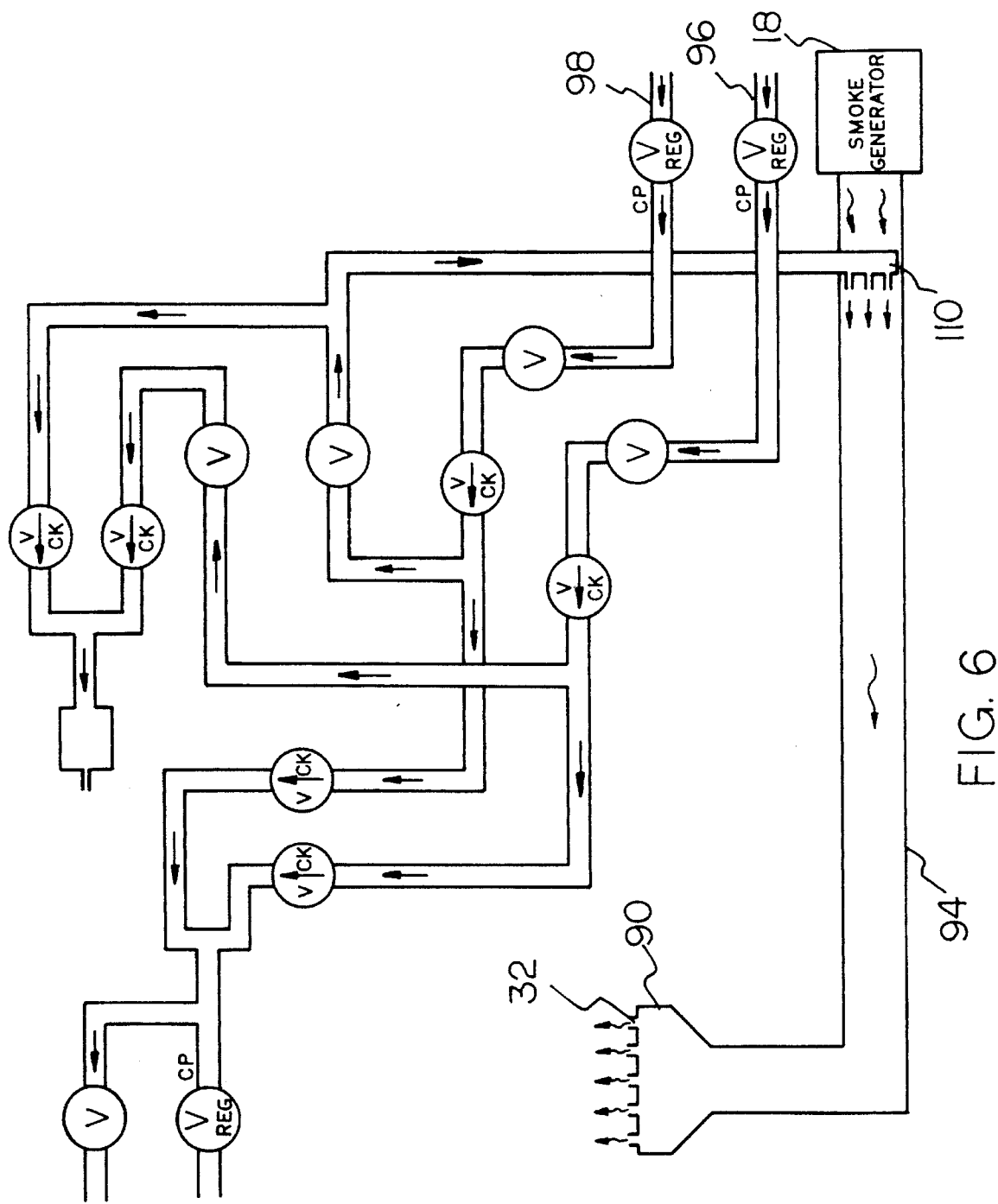
FIG. 6 is a schematic diagram of the apparatus.

The apparatus includes an air distribution tube 80 and a water distribution tube 82. The various tubes, valves and hoses of the apparatus are between one-quarter inch and one-half inch in diameter. Each distribution tube contains a plurality of apertures operatively coupled to the air and water control knobs respectively. The manipulation of the associated control knobs regulate the passage of air, water, or other chemicals through the tubes. A three-way connector 84 is coupled to the water distribution tube. A four-way connector 86 is coupled to the air distribution tube. A smoke control valve 88 is coupled to the smoke control knob. Note FIGS. 5 and 6.

A smoke reservoir 90 is formed in a cylindrical configuration and has a lower extent. The smoke reservoir is positioned in the hollow interior of the main housing unit. The reservoir is affixed around the smoke vent holes and lower member of the nozzle. The lower extent of the reservoir includes a funnel 92 with a open end. A four inch smoke conduit pipe 94 is formed in an elongated cylindrical configuration. A first end is coupled to the open end of the funnel and a second end is coupled to the smoke reception tube. Smoke introduced through the smoke reception tube travels through the smoke conduit pipe and accumulates in the smoke reservoir. Smoke from the reservoir escapes through the smoke vent holes in the top of the main housing unit. Note FIGS. 2, 5 and 6.

A water supply hose 96 and an air supply hose 98 are included with the apparatus. The various hoses of the apparatus are fabricated of nylon. The hoses are located in the interior of the main housing unit. Each hose has a first end coupled to the respective air and water connection ports. A second end is coupled to the respective air and water distribution tubes. A water nozzle hose 100 has a first end which is coupled to the three-way connector and a second end which is coupled within the water aperture in the lower member of the nozzle. Air, water, and other chemicals are introduced to the distribution tubes through the supply hoses. The water nozzle hose transports water to the nozzle. Note FIG. 5.

An air nozzle hose 102 has a first end coupled to the four-way connector and a second end coupled within the air aperture in the lower member of the nozzle. The air nozzle hose transports air to the nozzle. A water pinhole hose 104 has a first end which is coupled to the three-way connector and a second end which is coupled to the pinhole leak valve. An air pinhole hose 106 has a first end coupled to the four-way connector and a second end coupled to the pinhole leak valve. Note FIG. 5 and 6.

A short bypass hose 108 has a first end which is coupled to the four-way connector and a second end which is coupled in the smoke control valve. An auxiliary air hose 110 has a first end which is connected to the smoke control valve and a second end which is connected to the smoke reception tube. This configuration allows users to utilize the Venturi principle to accelerate the passage of smoke through the smoke vent holes by forcing air into the smoke reception tube. Note FIG. 5.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hazardous materials training cylinder comprising, in combination:

a main housing unit formed in a generally cylindrical configuration with a rounded top, a front region, a rear region including a handle, a flat bottom and an essentially hollow interior, the rear region including wheels rotatably mounted adjacent to the bottom, the top including a plurality of smoke vent holes, a nozzle extending upwardly from the approximate centerpoint of the top, the nozzle including a large water aperture, a small air aperture and a control handle to regulate the flow of air and water therethrough, the nozzle including a lower member with air and water apertures, the lower member extending downwardly into the interior of the main housing unit, the front region including two legs affixed to the bottom, a pinhole leak valve extending through the main housing unit beneath the top, the main housing unit further including upper and lower rectangular recesses positioned within the front region;

a control panel formed in a generally rectangular configuration and hingedly attached within the upper recess of the front region, the control panel having a plurality of rotatable knobs including a smoke control knob, a supply air knob, a supply water knob, a pinhole air knob and a pinhole water knob, corresponding indicia being located adjacent to each knob;

an intake panel formed in a generally rectangular configuration and hingedly attached within the lower recess of the front region, the intake panel having a plurality of connection ports formed in a generally circular configuration including an air connection port, a water connection port and a smoke connection port, an air pressure regulator valve and a water pressure regulator valve being releasable couplable within the air and water connection ports respectively, an air hose and a water hose being coupled to the air and water valves respectively, in an operative orientation the air and water hoses being coupled to an air and water source respectively, a smoke reception tube being located within the interior of the main housing unit and formed in a generally cylindrical configuration with a first open end coupled to the smoke connection port, the smoke reception tube including a free second open end, a smoke generator device including a rotatable control knob, the smoke generator device having a large output hose extending therefrom, the output hose having a free end couplable to the smoke connection port;

an air distribution tube and a water distribution tube, each distribution tube containing a plurality of apertures therethrough and being operatively coupled to the air and water control knobs respectively, a three-way connector being coupled to the water distribution tube and a four-way connector being coupled to the air distribution tube, a smoke control valve being operatively coupled to the smoke control knob;

a smoke reservoir formed in a generally cylindrical configuration and positioned within the hollow interior of the main housing unit, the reservoir being affixed around the smoke vent holes and lower member of the nozzle, the reservoir having a lower extent including a funnel with a open end, a smoke conduit pipe formed in an elongated cylindrical configuration with a first end coupled to the open end of the funnel and a second end coupled to the smoke reception tube; and air and water supply hoses each having a first end coupled to the respective air and water connection ports and a second end coupled to the respective air and water distribution tubes, a water nozzle hose having a first end coupled to the three-way connector and a second end coupled within the water aperture in the lower member of the nozzle, an air nozzle hose having a first end coupled to the four-way connector and a second end coupled within the air aperture in the lower member of the nozzle, a water pinhole hose having a first end coupled to the three-way connector and a second end coupled to the pinhole leak valve, an air pinhole hose having a first end coupled to the four-way connector and a second end coupled to the pinhole leak valve, a short bypass hose having a first end coupled to the four-way connector and a second end coupled within the smoke control valve, an auxiliary air hose having a first end connected to the smoke control valve and a second end connected to the smoke reception tube.

2. A hazardous materials training cylinder comprising:

a main housing unit having a front region, a rear region, a top and an essentially hollow interior, the top including a plurality of smoke vent holes and a nozzle extending upwardly therefrom, a control panel including plurality of control knobs and an intake panel having a plurality of connection ports, each said panel being affixed to the front region, a gas hose and valve and a liquid hose and valve being coupled to the gas and liquid ports respectively, a smoke generator device having a large output hose coupled to the smoke connection port; and gas and liquid distribution tubes being operatively coupled to the control panel, a smoke conduit having an upper end affixed around the smoke vent holes within the main housing unit and a lower end coupled to the smoke intake port, a smoke control hose operatively coupling the control panel to the smoke conduit, a plurality of gas and liquid supply hoses coupling the connection ports, gas and liquid distribution tubes, and nozzle together thereby permitting users to simulate hazardous material emergencies by manipulating the knobs of the control panel.

3. The hazardous materials training cylinder as set forth in claim 2 wherein the rear region includes a lower extent with wheels rotatably mounted thereto, the rear region having an upper extent with a handle affixed thereto, the wheels and handle permitting easy transportability of the apparatus.

4. The hazardous materials training cylinder as set forth in claim 2 and further including:

a pinhole leak valve extending through the main housing unit beneath the top, at least one pin hole leak hose operatively coupling the pinhole leak valve to the gas and liquid distribution tubes and control panel, the pin hole leak valve being utilized to simulate small hazardous material leaks.

5. The hazardous materials training cylinder as set forth in claim 2 wherein the gas utilized by the apparatus is air and the liquid utilized by the apparatus is water.

6. The hazardous materials training cylinder as set forth in claim 2 wherein the gas utilized by the apparatus is propane, ammonia or chlorine.

* * * * *